United States Patent [15] 3,661,524
Holden et al. [45] May 9, 1972

[54] PREPARATION OF TITANIUM CARBIDE

[72] Inventors: Calvin B. Holden, Doylestown; William L. Wilson, Barberton, both of Ohio

[73] Assignee: PPG Industries, Inc., Pittsburgh, Pa.

[22] Filed: Apr. 14, 1970

[21] Appl. No.: 28,495

[52] U.S. Cl. .......................................... 23/208 A, 106/299
[51] Int. Cl. ....................................................... C01b 31/30
[58] Field of Search ................................................. 23/208 A

[56] References Cited

UNITED STATES PATENTS 3,485,586   12/1969   Swaney ............................ 23/208 A
2,962,388   11/1960   Ruppert et al. .................. 23/208 A X
3,253,886   5/1966    Lamprey et al. ................... 23/208 X Primary Examiner—Herbert T. Carter
Attorney—Chisholm and Spencer

[57] ABSTRACT

Titanium carbide, usually in finely divided, particulate form and often predominantly in the form of small cubic crystals having a particle size range of from about 0.02 to about 1.0 micron and a weight median particle size of from about 0.08 to about 0.8 micron, is formed by reacting titanium halide in vapor state with halogenated hydrocarbon, e.g., chlorinated hydrocarbon, and hydrogen at carbide-forming temperatures. Control of the titanium carbide particle size is obtained by conducting the reaction in the presence of a nucleating amount of hydrocarbon, such as methane.

14 Claims, No Drawings

PREPARATION OF TITANIUM CARBIDE

DESCRIPTION OF THE INVENTION

Titanium carbide has been produced conventionally by the reaction of a source of titanium dioxide with coke or a similar form of carbon in an electrothermal furnace. Another method that has been proposed for producing titanium carbide consists of inter-reacting in the vapor phase a source of carbon, a volatile halide of titanium, and a reducing agent, such as aluminum, hydrogen or combinations thereof, in an enclosed reaction zone at carbide forming temperatures. See, for example, U. S. Pat. Nos. 3,205,042, 3,346,338, 2,952,598, and 3,340,020. See also, U. S. Pat. No. 3,399,980, which describes a process for the preparation of titanium carbide from a titanium halide without a reducing agent. Typically, the source of carbon in the above type reactions has been coke and other solid forms of carbon, or volatile hydrocarbons, such as methane. More recently, it has been found that halogenated hydrocarbons or compounds of carbon and halogen are a useful source of carbon in the above-described vapor state process for the preparation of titanium carbide. See, for example, U. S. Pat. No. 3,485,586.

Titanium carbide is a commercially useful material. When finely divided and pigmentary in character, it is useful as a black pigmenting agent in, for example, paints. It has also been found useful when used in combination with tungsten carbide or when used alone for the preparation of cemented carbide compositions. Such compositions find application as cutting tools for the machining of hard metals such as steel and titanium. Since the optimum particle size for various end uses can vary, it is desirable to be able to prepare titanium carbide of varying average particle size by one process.

It has now been found that the average particle size of titanium carbide produced by vapor phase reduction of titanium halide can be controlled. More particularly, it has been discovered that when halogenated hydrocarbons or compounds of carbon and halogen are used as the source of carbon in the production of titanium carbide by vapor phase reduction of titanium halide, the further addition of hydrocarbon to the reaction zone alters the average particle size of titanium carbide produced. This discovery provides a means for controlling the particle size of titanium carbide within the limits of the equipment used and lends versatility to the above-described vapor phase process.

It is known that titanium carbide can be produced by reacting a hydrocarbon, such as methane, with a titanium halide, such as titanium tetrachloride, in the presence of a reducing agent, such as hydrogen, at carbide forming temperatures. Average reaction temperatures typically used for the production of such carbides are normally above 1,500° C., and usually range from about 1,500° C. to about 4,000° C. or above. More recently it has been proposed that compounds of carbon and halogen or carbon, halogen and hydrogen be substituted for hydrocarbons as the source of carbon in the production of titanium carbide. See, for example, U. S. Pat. No. 3,485,586.

Typical of the titanium halides that can be employed in the above-described process include: titanium tetrachloride, titanium tetrabromide, titanium tetraiodide and titanium tetrafluoride, as well as subhalides of titanium, such as titanium dichloride, titanium trichloride and titanium trifluoride. Of course, subhalides other than the subchlorides and subfluorides can be used in the same manner. Further, mixtures of halides such as the chloride and the bromide can be employed as the titanium halide reactant.

The above-described process for producing titanium carbide by vapor phase reaction of titanium halide is typically conducted in the presence of a reducing agent, such as aluminum, hydrogen or combinations thereof. Typically, hydrogen alone is used.

In the process described herein, halogenated hydrocarbons are used as the source of carbon. As used herein, the term "halogenated hydrocarbon," e.g., "chlorinated hydrocarbon," is intended to mean and include both compounds of carbon, halogen and hydrogen, and compounds of carbon and halogen, e.g., carbon tetrachloride. Preferably, chlorinated hydrocarbons are used. Typically, $C_1-C_8$ halogenated hydrocarbons are used and examples thereof that can be employed in the present process include: methyl chloride, chloroform, methylene chloride, carbon tetrachloride, dichlorodifluoro methane, amyl chloride, chloroethane, vinyl chloride, 1,1-dichloroethylene, 1,2-dichloroethylene, 1,1-dichloroethane, 1,2-dichloroethane, ethylene dibromide, trichloroethylene, perchloroethylene, propylene dichloride, 1,1,2-trichloroethane, 1,1,1-trichloroethane, 1,1,1,2- and 1,1,2,2-tetrachloroethane, hexachloroethane and like aliphatic chlorides, fluorides, bromides or iodides containing up to about eight carbon atoms, preferably, up to about six carbon atoms. Aromatic halocarbon compounds, e.g., chlorocarbon compounds, can also be used. Such compounds include $C_6-C_9$ halogenated aromatic compounds, such as monochlorobenzene, orthodichlorobenzene, paradichlorobenzene and the like. Cycloaliphatic halides, such as the $C_5-C_6$ aliphatic halides, e.g., chlorinated cyclopentadiene, cyclohexyl chloride, etc., can also be used.

Typically, the above-described halogenated hydrocarbons should be readily vaporizable (volatile) without tar formation since otherwise unnecessary difficulties which are unrelated to the process itself can arise, such as plugging of lines by decomposition and/or polymerization products produced in the course of vaporizing the hydrocarbon.

The amount of reducing agent, e.g., hydrogen, utilized in the above-described process should be at least that amount which is required stoichiometrically to satisfy the theoretical demand of the reaction. Typically, the amount of hydrogen used is in substantial excess of the theoretical amount. When the titanium halide used is titanium tetrachloride, and a chlorinated hydrocarbon is used as the source of carbon, the theoretical amount or demand of hydrogen required can be expressed by the equation:

$$n\text{TiCl}_4 + C_nH_mCl_x + (2n + \tfrac{1}{2}x - \tfrac{1}{2}m)H_2 \rightarrow n\text{TiC} + (4n + x)\text{HCl}$$

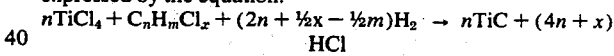

wherein, $n$ reflects the number of carbon atoms, $m$ reflects the number of hydrogen atoms, and $x$ reflects the number of chlorine atoms in the compound of chlorine and carbon used. Similarly, when other titanium halides are used, the amount of elemental hydrogen used should be well in excess of the chemical equivalent of the halogen of the titanium halide. Often the amount of hydrogen utilized will be in excess of 10 times and as high as 100 times the amount of hydrogen shown to be required by the above equation or required to equal the chemical equivalence of halogen of the titanium halide.

The amount of halogenated hydrocarbon used in the above-described process is also at least the stoichiometric amount required by the above equation or required to equal the chemical equivalence of titanium of the titanium halide. Usually, at least 20 percent and often 50 to 300 percent in excess of the amount required by the above equation is used.

In carrying out the vapor phase reaction of titanium halide to form titanium carbide in the manner described above, any convenient method can be employed. Thus, for example, all of the reactants can be heated to reaction temperature and then admixed in a suitable reaction zone or one or more but not all of the reactants can be heated to temperatures in excess of reaction temperature and admixed in the reaction zone with other reactant(s) which have been introduced into the reaction zone at temperatures below reaction temperature. The highly heated reactant(s) brings the other reactant(s) to reaction temperature quickly and causes formation of titanium carbide.

A convenient method for thus producing titanium carbide is described in U. S. Pat. No. 3,485,586. In such patent, hydrogen is heated by electrical energy to temperatures well above 1,500° C., usually in the range of 1,500° to 4,000° C.

Thus-heated hydrogen is introduced into the reaction zone where titanium halide and halogenated hydrocarbon are mixed with it. Electrical heating of hydrogen can be performed by passing hydrogen through a discharge of electrical energy conducted between electrodes, i.e., an arc plasma heater, or passing hydrogen through an induction plasma heater. When heated to temperatures in the range described above, hydrogen is partially ionized and forms what is conventionally termed a plasma. Apparatus for producing such plasmas are typically referred to as plasma arc heaters or induction plasma heaters. Typical examples of such heaters are described in U. S. Pat. No. 3,485,586.

In accordance with the present invention, it has been found that when the vapor phase process described above is conducted in the presence of a small but critical amount of hydrocarbon, the particle size of the titanium carbide formed can be controlled. Although not wishing to be bound by any particular theory, it is believed that the hydrocarbon nucleates the titanium halide reaction, i.e., forms nuclei or sites upon which titanium carbide formed in the principal reaction can precipitate, by some, as yet unascertained, mechanism. These sites or nuclei are extremely small and are believed to be in the range of 1–10 millimicrons in size.

While not intending to be bound by any particular theory, it has been suggested that the hydrocarbon reacts more rapidly with the titanium halide than the halogenated hydrocarbon and thereby forms extremely fine titanium carbide particles which nucleate the reaction of the titanium halide with the halogenated hydrocarbon. Another suggestion proposed has been that the hydrocarbon forms small particles of carbon which act as nucleating sites upon which the titanium carbide formed can precipitate. Regardless of the mechanism involved, the presence of the hydrocarbon alters the particle size of the titanium carbide produced and thereby gives a method of controlling the particle size of the TiC product within the capabilities of the equipment. Thus, the design of the atom, equipment, which determines the range of rate of flow of reactants and enthalpy input to the reactor, sets the product particle size range that can be efficiently produced. The present discovery enhances the capabilities of the equipment and gives versatility to the type of product that can be made.

Typically, and in accordance with the present invention, between about 0.1 and about 10 atom percent, preferably from about 0.5 to about 5 atom percent, of carbon contained in the hydrocarbon, based on the amount of titanium halide used, is employed. The greater the amount of hydrocarbon introduced into the reaction zone, within the limits described, the smaller the average particle size of titanium carbide produced, as indicated by surface area measurements. Thus, the greater the number of carbon atoms in the hydrocarbon compound used in accordance with the present process, the less the amount of that hydrocarbon, on a weight or mole percent basis, is needed. For example, in the case of methane ($CH_4$), which has one carbon atoms, 0.1–10 mole percent would be required to provide from 0.1–10 atom percent carbon. When the hydrocarbon has two carbon atoms, such as contained in ethane ($C_2H_6$), ethylene ($C_2H_4$), or acetylene ($C_2H_2$), only 0.05 to 5 mole percent are required to provide from 0.1–10 atom percent carbon. Similarly, when propane ($C_3H_8$) or cyclopentane ($C_5H_{10}$) are used, only 0.03–3.3 mole percent or 0.02–2 mole percent, respectively, would be required to provide from 0.1–10 atom percent carbon.

When the amount of hydrocarbon used approaches about 10 atom percent, based on titanium halide, processing difficulties in the manner of titanium carbide and carbon deposits on the walls of the reactor and on gas inlet ports occur. The extent of such deposits at various levels of hydrocarbon addition depends to a great extent on the geometry of the reactor and gas inlet ports. However, at levels of hydrocarbon addition approaching 10 atom percent, the effect of geometry on the occurrence of these deposits tends to be lessened. Such deposits are composed largely of titanium carbide which is in a dense, massive form (as distinguished from a light particulate form) which is tightly bonded to the walls of the apparatus, particularly, those walls close to the principal reaction zone, i.e., that zone where the major portion of the vapor phase reaction occurs. Such crystalline or carbonaceous deposits are tightly sintered or otherwise bonded together and to the equipment walls forming a more or less continuous coating on the walls and at the gas inlet ports. This is in contrast to the loose, finely divided particles which often tend to accumulate as a dust or cluster of particles on other walls of the equipment downstream of the principal reaction zone and plasma flame. Such loose deposits can be brushed off readily and have a particle size substantially the same as that of the titanium carbide product formed and swept through the system suspended in the reaction product gases.

The above-described nucleating amount of hydrocarbon can be introduced into the reaction zone as a liquid or vapor and in any convenient manner. For example, it can be introduced admixed with the titanium halide or halogenated hydrocarbon. Alternatively, the hydrocarbon can be admixed with hydrogen introduced into the reaction zone or it can be introduced as a separate stream. Preferably, the hydrocarbon is admixed with the titanium halide reactant.

Utilization of hydrocarbon in the manner described above permits variation in the particle size of titanium carbide produced by the vapor phase reduction of titanium halide in the presence of a source of carbon. In addition, it has been discovered that when a hydrocarbon is used in the manner described, the percent of titanium carbide recovered also increases despite the trend to smaller particles, i.e., more titanium carbide is recovered in the principal recovery zone than when hydrocarbon is not used.

The titanium carbide produced in accordance with the above-described process is typically submicron in character and varies from about 0.02 to about 1.0 micron and a weight median particle size of from about 0.08 to about 0.8 micron. It is not pyrophoric.

Hydrocarbons that can be used as nucleating agents in the process described herein include the normally gaseous or liquid but readily volatile hydrocarbons including saturated and unsaturated $C_1$–$C_{12}$, preferably $C_1$–$C_6$, hydrocarbons such as methane, ethane, propane, the butanes, the pentanes, decane, dodecane, ethylene, propylene, the butylenes and amylenes, symmetrical dimethylethylene and like alkenes, cycloaliphatic and aromatic hydrocarbons, such as cyclopentane, cyclohexane, toluene, benzene, etc., acetylenic compounds of which may be noted acetylene, methyl acetylene, ethyl acetylene, and dimethyl acetylene. Methane or propane are economically preferred for this purpose. Rarely are hydrocarbons of more than 12 carbons used.

The present process is more particularly described in the following examples which are intended as illustrative only since numerous modifications and variations therein will be apparent to those skilled in the art. In the following examples, volumes of gas are expressed in liters as volumes at 760 millimeters of mercury pressure and 0° C.

EXAMPLE I

Titanium carbide was produced by vapor phase reaction of titanium tetrachloride with 1,1,2-trichloroethane in the presence of hydrogen in a manner substantially similar to that described in Example I of U. S. Pat. No. 3,485,586. More particularly, hydrogen was heated by passage through a plasma arc heater of the nature described in FIG. 2 of U. S. Pat. No. 3,485,586. Hydrogen was fed at a rate of 140 liters per minute into the arc heater. The arc heater was a medium voltage medium amperage heater having a power input of 26 kilowatts. The heater operated with an efficiency of about 58 percent at an impedance of 1.32 ohms. The hot hydrogen plasma flame from the arc heater was directed into a suitable reaction zone and admixed with titanium tetrachloride and 1,1,2-trichloroethane. These reactants were supplied to the reaction zone by vaporizing liquid titanium tetrachloride and mixing with the $TiCl_4$ vapors hydrogen at substantially room temperature to produce a hydrogen-$TiCl_4$ stream. This stream was introduced into the reaction zone at a rate of 18.8 grams of vaporized $TiCl_4$ and 4.7 liters of hydrogen per minute. A mixture of hydrogen and vaporous 1,1,2-trichloroethane, at a rate of 22.2 liters of hydrogen and 14.2 grams of vaporized 1,1,2-trichloroethane per minute was also introduced into the reaction zone. Following reaction, the gaseous mixture emanating from the reaction zone was quenched to below 300° C. in less than one second.

The yield of titanium carbide was 92.6 percent of theory based on $TiCl_4$ and the product was a finely-divided, fluffy, black powder of face-center cubic crystals having a BET surface area of about 4.5 $m^2$/gram.

EXAMPLE II

Titanium carbide was produced in the manner described in Example I except that methane in varying amounts was added to the 1,1,2-trichloroethane. The results are tabulated in Table I.

TABLE I

| RUN | Amount of Methane (Atom %) | BET Surface Area ($m^2$/gram) |
|---|---|---|
| A | 1 | 5.4 |
| B | 1½ | 6.1 |
| C | 2 | 6.9 |
| D | 3 | 9.6 |
| E | 10 | 6.8 |

In Runs A and B above, no growth of titanium carbide and carbon deposits were observed in the equipment following completion of the respective runs. In Runs C and D, a small amount of growth was observed and in Run E a significant amount of growth was found. The comparatively low surface area of the product from Run E was attributed to changes in mixing and reaction rates caused by the observed deposits around the reactant inlet tubes and the reaction zone.

The data of Examples I and II show that the particle size of titanium carbide produced by vapor phase reduction of titanium tetrachloride with a halogenated hydrocarbon can be modified by introducing a small amount of hydrocarbon into the reaction zone.

EXAMPLE III

The procedure of Example II is repeated using first ethylene and then propane instead of methane. A similar change in product surface area is observed with each.

Although the present process has been described with reference to specific details of certain embodiments thereof, it is not intended that such details should be regarded as limitations upon the scope of the invention except as and to the extent that they are included in the accompanying claims.

We claim:

1. In the process of producing titanium carbide by vapor phase reaction of titanium halide, reducing agent and halogenated hydrocarbon, the improvement which comprises conducting said reaction in the added presence of an amount of hydrocarbon sufficient to provide from about 0.1 to about 10 atom percent of carbon, based on the titanium halide, whereby to control the particle size of the titanium carbide produced.

2. The process of claim 1 wherein said halogenated hydrocarbon is a chlorinated hydrocarbon.

3. The process of claim 2 wherein said titanium halide is selected from the group consisting of titanium tetrachloride, titanium tetrabromide, titanium tetraiodide and titanium tetrafluoride and said reducing agent is hydrogen.

4. The process of claim 3 wherein said hydrocarbon is methane.

5. The process of claim 3 wherein the titanium carbide produced has a weight median particle size of from about 0.08 to about 0.8 micron.

6. The process of claim 1 wherein said hydrocarbon has from one to 12 carbon atoms and is present in amounts sufficient to provide from about 0.5 to about 5 atom percent of carbon.

7. In the process of producing titanium carbide by vapor phase reaction of titanium tetrachloride, hydrogen and halogenated hydrocarbon, the improvement which comprises conducting said reaction in the presence of a nucleating amount of $C_1$–$C_{12}$ hydrocarbon, thereby to control the particle size of the titanium carbide produced, and recovering titanium carbide product having a weight median particle size of from about 0.08 to about 0.8 micron.

8. The process of claim 7 wherein said $C_1$–$C_{12}$ hydrocarbon provides from about 0.1 to about 10 atom percent of carbon based on titanium tetrachloride.

9. The process of claim 7 wherein said halogenated hydrocarbon is a chlorinated hydrocarbon.

10. The process of claim 9 wherein said chlorinated hydrocarbon is 1,1,2-trichloroethane.

11. In the process of producing titanium carbide by vapor phase reaction of titanium tetrachloride, hydrogen and halogenated hydrocarbon, the improvement which comprises conducting said reaction in the presence of an amount of $C_1$–$C_{12}$ hydrocarbon sufficient to provide from 0.5 to about 5 atom percent of carbon based on the titanium halide whereby to control the particle size of the titanium carbide produced.

12. The process of claim 11 wherein said halogenated hydrocarbon is a chlorinated hydrocarbon.

13. The process of claim 12 wherein said chlorinated hydrocarbon is 1,1,2-trichloroethane and said hydrocarbon is methane.

14. The process of claim 12 wherein the titanium carbide produced has a weight median particle size of from about 0.08 to about 0.8 micron.

* * * * *